Figure 3:
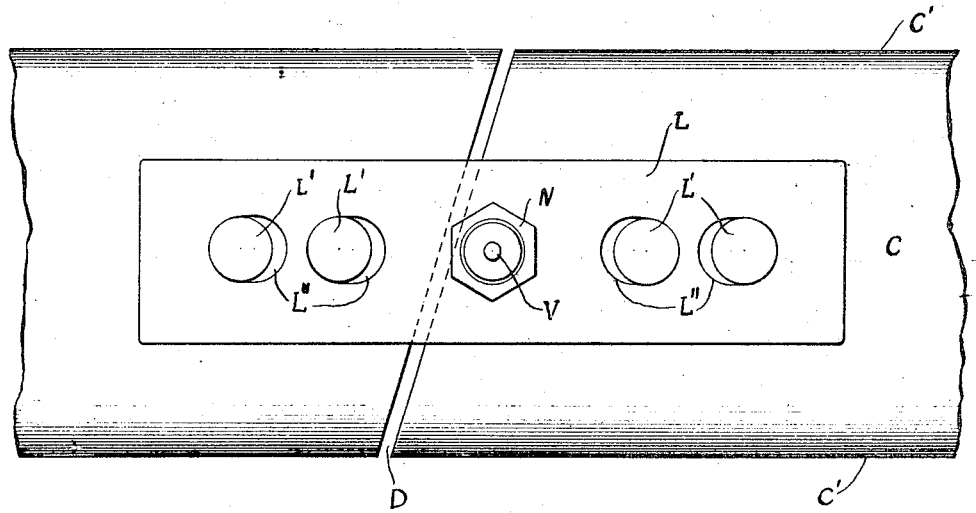

E. K. BAKER.
AUTOMOBILE WHEEL.
APPLICATION FILED FEB. 6, 1911.
1,095,779.
Patented May 5, 1914.
2 SHEETS—SHEET 1.
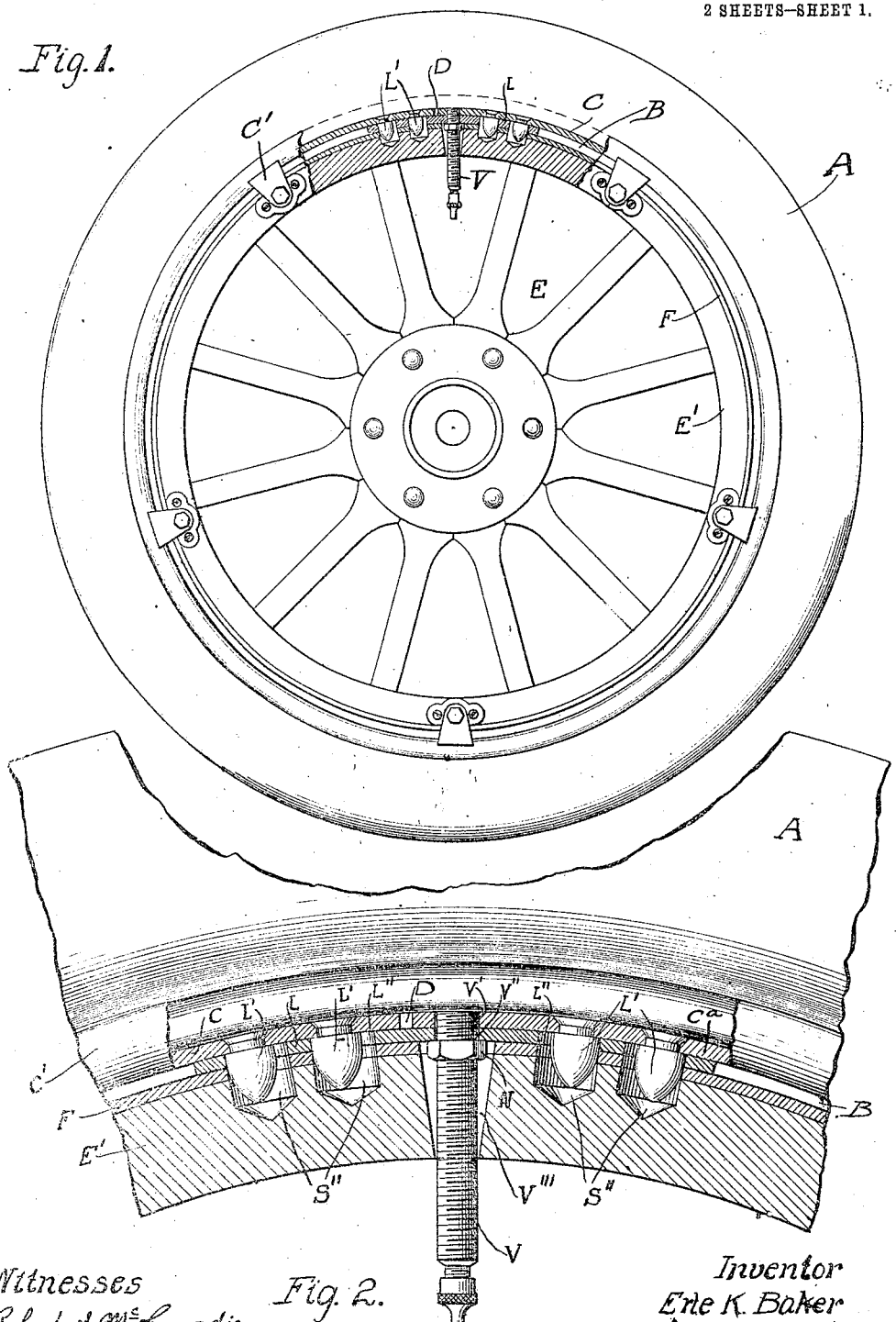
Fig. 1.
Fig. 2.
Witnesses
Robert A. McCreadie
Edgar P. Beaubien
Inventor
Erle K. Baker
by 
Attorney

E. K. BAKER.
AUTOMOBILE WHEEL.
APPLICATION FILED FEB. 6, 1911.

1,095,779.

Patented May 5, 1914.
2 SHEETS—SHEET 2.

Witnesses.
Robert S. McCreadie
Edgar F. Beaubien

Inventor
Erle K. Baker
by
Attorney

UNITED STATES PATENT OFFICE.

ERLE K. BAKER, OF CHICAGO, ILLINOIS, ASSIGNOR TO UNIVERSAL RIM COMPANY, OF CHICAGO, ILLINOIS, A CORPORATION OF ILLINOIS.

AUTOMOBILE-WHEEL.

1,095,779. Specification of Letters Patent. Patented May 5, 1914.

Application filed February 6, 1911. Serial No. 606,992.

*To all whom it may concern:*

Be it known that I, ERLE K. BAKER, a citizen of the United States, and a resident of Chicago, Cook county, Illinois, have invented certain new and useful Improvements in Automobile-Wheels, of which the following is a full, true, clear, and exact description, such as will enable others skilled in the art to make and use the same.

My invention relates to improvements in demountable tire carrying rims for automobile wheels and has special reference to improvements in and modifications of the so-called bolted-on demountable rim described and claimed in my co-pending application Serial No. 566,605, filed June 13th, 1910.

The object of this invention is to improve the means for connecting the ends of integrally flanged and transversely split demountable rims.

My invention consists generally in a one-piece integrally flanged and transversely split demountable rim having studs or projections extending inwardly from its ends in combination with a plate having openings to fit said studs and therewith serving to positively though detachably tie the ends of the rim together against lateral separation and expansion.

My invention also consists in the various novel constructions and combinations of parts, all as hereinafter described and particularly pointed out in the claims.

The invention will be more readily understood by reference to the accompanying drawings which depict my invention in its preferred form, and in which, Figure 1 shows an automobile wheel and tire equipped with a demountable rim embodying my invention, portions of the rim and tire being shown in section; Fig. 2 is an enlargement of the sectioned portion of Fig. 1; and, Fig. 3 is an enlarged view of the inner periphery of the rim disclosing the split or cut in the rim and the means which I employ to connect the ends of the rim and space them from the wheel periphery.

As shown in the drawings my rim is of the bolted-on type, that is, it is a rim that is larger than the wheel and is secured thereto by wedge lugs and bolts.

E' is the felly of the wheel E and F is the felly band. The rim C being of greater circumference, a circumferential or annular space B is formed between the wheel and felly band. This space admits the wedge portions of the wedge or clamping lugs G by which the rim is centered, supported and secured upon the wheel. The rim has a substantialy cylindrical body portion C$^a$ and its two tire retaining flanges C' are integral therewith.

V represents the valve stem of the pneumatic tire A. The stem extends from the tire through a hole V' provided in the body portion C$^a$ of the rim, and also passes through the hole V''' in the felly E'. At a point adjacent to the valve stem hole I transversely split the rim, as by sawing it through transversely. The split or cut in the rim is shown at D. My purpose in splitting the rim in this manner is to facilitate and enable the placing of the rim within pneumatic tires, particularly such as have non-stretchable base beads, which, obviously, would prevent the use of an endless rim having integral flanges. I provide the ends of the rim with inwardly extending studs L', preferably two on each end of the rim. These studs are preferably of sufficient length to cross the space B and are accommodated in holes S'' in the felly band and felly. The studs are preferably pointed to facilitate their placement in the holes S'' at the time that the valve stem is passed through the hole V'''. As both ends of the rim are thus joined to or engaged with the wheel felly it is clear that the rim is held against circumferential movement on the wheel. The studs are called drivers for this reason. To hold the ends of the rim together and in circumferential and transverse alinement, both while the rim is on the wheel and before it is placed thereon, I employ a simple curved plate L having a hole V'' for the valve stem V and having holes L'' for the studs L'. The holes L'' are so positioned that when the plate is in place on the studs and against the inner periphery of the rim the split D is practically closed. The plate bridges the split and being of a thickness to substantially fill the space D it serves as a spacing element between the rim ends and the felly band, thus properly supporting the ends of the rim.

In practice I make the holes in the plate and felly band large enough to allow slight lost motion between the rim ends and plate and thus avoid too great nicety in making and fitting the parts together. A nut N may be used on the valve stem to hold the plate in place when not mounted on the wheel. The rim is mounted upon and demounted from the wheel in the same manner as in the case of endless bolted-on rims.

Having thus described my invention I claim as new and desire to secure by Letters Patent:

1. A one-piece transversely split demountable rim of the herein described bolted-on class, having integral tire holding flanges and provided with inwardly extending driver studs on its ends, in combination with a curved split-bridging member perforated to fit said studs therewith tying the rim ends together in alinement and serving as a spacer, substantially as described.

2. A one-piece transversely split demountable rim of the herein described bolted-on class, having integral tire holding flanges and provided with inwardly extending studs on its ends, in combination with a curved split-bridging member perforated to fit said studs and therewith tying the rim ends together in alinement and serving as a spacer, substantially as described.

3. A one-piece transversely split demountable rim of the herein described bolted-on class, having integral tire holding flanges and provided with inwardly extending studs on its ends, in combination with a curved split-bridging member perforated to fit said studs and therewith tying the rim ends together in alinement, substantially as described.

4. A one-piece transversely split demountable rim of the herein described bolted-on class, having integral tire holding flanges and provided with driving parts on its ends and projecting from its inner periphery, in combination with a detachable member serving to tie said driving parts together and hold the rim ends in alinement.

5. A one-piece transversely split demountable rim of the herein described bolted-on class and having integral tire holding flanges, in combination with a curved split-bridging spacer member, said member and the rim ends having interfitting holes and studs and tying the rim ends together in alinement, substantially as described.

6. A one-piece transversely split demountable rim of the herein described bolted-on class and having integral tire holding flanges, in combination with a curved split-bridging spacer member, said member and the rim ends having interfitting holes and studs and tying the rim ends together in alinement, and said rim and member containing valve stem holes, substantially as described.

7. A one-piece transversely split demountable rim of the herein described bolted-on class having integral tire-holding flanges and provided with parts projecting from its inner periphery, a detachable member serving with certain thereof to tie said rim ends together and hold them in alinement, and one of said inwardly projecting parts adapted to serve as a driver.

8. A one-piece transversely split demountable rim of the herein described bolted-on class, in combination with a complementary wheel upon which the rim is mounted, said rim being provided with rim-end connecting parts projecting from its inner periphery, a detachable member serving to tie said connecting parts together and thus hold the rim ends together and in alinement, there being upon said rim and the felly of the wheel complementary driving projections and interfitting sockets.

In testimony whereof, I have hereunto set my hand this 18th day of January, 1911, in the presence of two subscribing witnesses.

ERLE K. BAKER.

Witnesses:
JOHN R. LEFEVRE,
EDGAR F. BEAUBIEU.